(12) United States Patent
Tateishi

(10) Patent No.: US 6,239,572 B1
(45) Date of Patent: May 29, 2001

(54) SERVO CONTROL APPARATUS

(75) Inventor: Kiyoshi Tateishi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/503,360

(22) Filed: Feb. 14, 2000

(30) Foreign Application Priority Data

Feb. 12, 1999 (JP) ................................................. 11-034808

(51) Int. Cl.⁷ .................................................. G05B 11/36
(52) U.S. Cl. .................... 318/605; 318/560; 318/568.22; 318/563; 318/569; 318/567
(58) Field of Search .................... 318/609, 560, 318/568.22, 563, 569, 567

(56) References Cited

U.S. PATENT DOCUMENTS 6,163,286 * 12/2000 Lee et al. .............................. 318/609
6,175,385 * 1/2001 Kohiyama et al. ................... 348/537

* cited by examiner

*Primary Examiner*—Karen Masih
(74) *Attorney, Agent, or Firm*—Nixon & Vanderhye

(57) ABSTRACT

A servo control apparatus for performing a feedback control to an analog controlled system, includes an error generating device that generates a digital error corresponding to a difference between a desired value and a feedback value corresponding to a controlled variable of the analog controlled system, a control device that generates a digital manipulated variable, and a digital-to-analog converting device that converts the digital manipulated variable into an analog manipulated variable for driving the analog controlled system. The control device includes a disturbance estimating device that estimates a disturbance applied to the analog controlled system by carrying out a digital estimating process by using the digital manipulated variable and the digital error and generates a digital compensated variable corresponding to the estimated disturbance, and a manipulated variable generating device that generates the digital manipulated variable by using the digital error and the digital compensated variable.

12 Claims, 13 Drawing Sheets

SERVO CONTROL APPARATUS

BACKGROUND OF THE INVENTION

1. Field of the Invention

The present invention relates to a servo control apparatus which controls a controlled system by a feedback control, and more particularly, to a servo control apparatus which estimates a disturbance applied to the controlled system, and carries out a feedback control while compensating an actual disturbance on the basis of the estimated disturbance.

2. Description of the Related Art

In recent years, the following research and development have been actively made. When controlling a controlled system by a feedback control, a disturbance applied to the controlled system is estimated, and a manipulated variable considering the estimated disturbance is applied to the controlled system, and thereby, a feedback control is carried out while compensating an actual disturbance on the basis of the estimated disturbance.

Thus, a state observer has recently attracted interest as a preferable device for estimating the disturbance.

The principle of the state observer will be described below.

The observer is a device for estimating a state incapable of being actually detected, from a detectable state. The state incapable of being actually detected is a state where a disturbance is actually applied to the controlled system, for example. The observer estimates a disturbance applied to the controlled system, and then, computes a compensated variable capable of canceling the actual disturbance, and further, adds the compensated variable to a feedback control object so as to compensate the actual disturbance.

Next, a disturbance estimating process by the observer will be described below with reference to FIG. 13. FIG. 13 shows the case of applying the observer with respect to a focus servo control object which controls a focus actuator included in an optical disk reproducing apparatus such as a CD (Compact Disk) player as a controlled system. In particular, FIG. 13 shows a feedback servo loop formed in the focus servo control system.

The focus actuator (hereinafter, referred simply to as actuator) is an actuator for moving an objective lens in the direction perpendicular to an information recording surface of an optical disk, to focus a light beam on the information recording surface of the optical disk.

In FIG. 13, a controlled object U(s) is set as an actuator, and a controlled variable y is set as a position of the actuator in the direction perpendicular to the optical disk.

Now, a transfer function of the actuator is expressed as a second-order lag control system as follows.

$$U(s)=A\times wa^2/(S^2+2\times ka\times wa\times s+wa^2) \quad (1)$$

where, A is a gain (m/Ampere) of actuator, ka is a viscous braking coefficient of the actuator, and wa is a natural vibration frequency (rad/sec) of the actuator.

Next, supposing a conversion sensitivity for a focus error signal output in the actuator as a positional detection sensitivity Ke (Volt/m), the following equation (2) is formed. Incidentally, the conversion sensitivity is determined by a sensitivity of photo-detector and an amplification factor of an error generating amplifier included in the optical disk reproducing apparatus.

$$REF-y\times Ke=er \quad (2)$$

where, REF is a desired value on which an actuator should be positioned, er is an error in the aforementioned feedback control system. As shown in FIG. 13, the error er obtained by the above equation (2) is supplied to one input terminal of an observer.

In FIG. 13, a relationship between a manipulated variable (voltage value) u and a drive current i for driving the actuator is expressed as follows.

$$i=Kdr\times u \quad (3)$$

where, Kdr (Ampere/Volt) is a voltage/current conversion sensitivity of a driver. The driver is controlled by the manipulated variable u, thereby generating the drive current i. The drive current i is converted into a drive voltage v by a current/voltage converter having a current/voltage conversion sensitivity Kiv (Volt/Ampere) as shown in the following equation (4), and then, is supplied to the other input terminal of the observer.

$$V=Kiv\times i \quad (4)$$

where, the current/voltage conversion Kiv is equivalent to a conversion sensitivity with respect to the feed back of the drive current i to the observer. Namely, the current/voltage conversion Kiv corresponds to a so-called return resistance.

Next, in order to simplify an explanation, a disturbance applied to an actuator is regarded as only disturbance with respect to a certain position. Then, as shown in FIG. 13, if a disturbance variable is set as d, the following equation (5) is formed.

$$i\times U(s)+d=y \quad (5)$$

Here, in the above equation (2), when the desired value REF is set as zero (REF=0), the equation (2) becomes the following equation.

$$y\times Ke=-er \quad (2A)$$

Further, the following equation is obtained from the above equation (4).

$$i=v/Kiv \quad (4A)$$

Further, if i and y in the equation (5) are eliminated by using the equations (2A) and (4A), the following equation is formed.

$$(v/Kiv)\times U(s)+d=-er/Ke$$

When arranging the this equation, the disturbance variable d is expressed as shown in the following equation (6), using the input voltage v and the error er supplied to the observer.

$$d=-er/Ke-(v/Kiv)\times U(s) \quad (6)$$

In this case, parameters schematically showing an interior of the observer is expressed as nominal values, and an additional character n is appended to each nominal value in expression in order to distinguish actual control elements from the nominal value. Namely, the positional detection sensitivity Ke is expressed as a positional detection sensitivity nominal value Ken, the voltage/current conversion sensitivity Kdr is expressed as a voltage/current conversion sensitivity nominal value Kdrn, the current/voltage conversion sensitivity Kiv is expressed as a current/voltage conversion sensitivity nominal value Kivn, and the controlled system U(s) is expressed as a controlled system nominal value Un(s).

Incidentally, the nominal value is a torque rated value of a spindle motor for rotating the optical disk in the optical disk reproducing apparatus, and is indicative of a value shown by a performance indication of the optical disk reproducing apparatus. If there is no performance indication, the nominal value is determined by an experiment or the like, or is computed (calculated) from a theoretical calculation. Incidentally, there is the case where the nominal value and an actual control element are not always equal to each other due to factors such as inaccurate determination or calculation, aged deterioration, temperature change or the like.

On the basis of the above equation (6), when an estimated disturbance variable DOBS, which is an estimated variable of the disturbance d, is expressed using each nominal value, the following equation (7) is obtained.

$$DOBS = -er/Ken - (v/Kivn) \times Un(s) \quad (7)$$

Thus, as is evident from the above description, it is possible to estimate and compute the estimated disturbance variable DOBS from the input voltage v and the error er by using the observer without detecting the actual disturbance d.

Moreover, in FIG. 13, the estimated disturbance variable DOBS is converted into a compensated variable h by a robust filter R(s), and then, the compensated variable h is added to a variable which is obtained by phase-compensating the error er with a phase compensator C(s), and thus, a manipulated variable u is generated so as to suppress the disturbance d.

On the other hand, in recent years, it is general that the total process of feedback control system including the observer is digitally carried out by one DSP (Digital Signal Processor) at a high speed and high accuracy.

However, it is general that the above controlled system U(s) is driven by a drive current i which is usually an analog signal. Thus, it is a frequent case that a desired value REF, which is a target of control, is also an analog signal.

Therefore, in the case of treating these analog signals with the DSP which is a digital circuit, in FIG. 13, at least an A/D converter for digitizing the error er, an A/D converter for digitizing the drive voltage v, and a D/A converter for analogizing the manipulated variable u are needed. As a result, the structure of the servo control device becomes complicate. Further, if the servo control device is realized as an IC chip, an occupied area increases, and a production cost becomes high.

Moreover, the above description has shown the case where the controlled system U(s) is a focus actuator. In the case where the controlled system U(s) is a tracking actuator, a slider motor or a spindle motor, the problems similar to above take place. Incidentally, the tracking actuator is a device for finely adjusting a light beam irradiation position in the radial direction of the optical disk by moving the objective lens in the direction parallel to the information recording surface of the optical disk. The slider motor is a device for roughly adjusting a radial position of light beam irradiation position by moving a pickup. The spindle motor is a device for controlling a rotational frequency of the optical disk.

SUMMARY OF THE INVENTION

It is therefore an object of the present invention to provide a servo control apparatus which can digitally estimate a disturbance applied to a controlled system, and can realize an operation for suppressing the disturbance with a simple structure, and further, can achieve a device miniaturization and a cost reduction.

A servo control apparatus in accordance with the present invention performs a feedback control to an analog controlled system. The servo control apparatus includes: an error generating device that generates a digital error corresponding to a difference between a desired value and a feedback value corresponding to a controlled variable of the analog controlled system; a control device that generates a digital manipulated variable; and a digital-to-analog converting device that converts the digital manipulated variable into an analog manipulated variable for driving the analog controlled system. The control device includes: a disturbance estimating device that estimates a disturbance applied to the analog controlled system by carrying out a digital estimating process by using the digital manipulated variable and the digital error, and generates a digital compensated variable corresponding to the estimated disturbance; and a manipulated variable generating device that generates the digital manipulated variable by using the digital error and the digital compensated variable.

As can be understood from the above configuration, in the servo control apparatus of the present invention, a disturbance applied to the analog controlled system can be estimated in a digital process without using the analog manipulated variable. Therefore, an analog-to-digital converter for converting the analog manipulated variable into the digital manipulated variable is not needed. Accordingly, the number of components of the servo control apparatus can be reduced, and thus, the structure of the servo control apparatus can be simplified. Hence, cost reduction and chip miniaturization can be achieved.

To improve the performance of estimating the disturbance, the disturbance estimating device may estimate the disturbance at a current sample timing by using the digital manipulated variable at a previous sample timing and the digital error at the current sample timing.

To improve the accuracy of estimating the disturbance, the control device may further include an estimated manipulated variable generating device that generates a digital estimated manipulated variable by multiplying the digital manipulated variable at a previous sample timing by a nominal value corresponding to a sensitivity of the analog-to-digital device, and a disturbance estimating device may estimate the disturbance by using the digital estimated manipulated variable and the digital error at a current sample timing.

In the case where a drive device for driving the analog controlled system by using the analog manipulated variable is added to the servo control apparatus, the control device may further include an estimated manipulated variable generating device that generates a digital estimated manipulated variable by using a product of the digital manipulated variable at a previous sample timing, a nominal value corresponding to a sensitivity of the analog-to-digital device and a nominal value corresponding to a sensitivity of the drive device.

In the servo control apparatus in accordance with the present invention, the manipulated variable generating device may generate the digital manipulated variable by using the digital compensated variable at a previous sample timing and the digital error. By using the digital compensated variable at a previous sample timing, the disturbance can be also estimated accurately.

In the servo control apparatus in accordance with the present invention, the disturbance estimating device may estimate the disturbance on the basis of an internal state thereof at a previous sample timing. On the basis of an internal state of the disturbance estimating device, the disturbance can be also estimated accurately.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, the preferred embodiments of the present invention will be described with reference to the accompanying drawings.

Each embodiment described below shows the case where the present invention is applied to an information reproducing apparatus which reproduces information recorded in an optical disk. In the information reproducing apparatus, a feedback control system including an observer is used for a rotation servo control of an optical disk, a focus servo control, a tracking servo control, and a slider servo control with respect to a pickup.

(I) First Embodiment

A first embodiment of the present invention will be described below with reference to FIG. 1 to FIG. 5.

The first embodiment described below shows the case where the present invention is applied to a rotation servo control of an optical disk in an information reproducing apparatus.

Figure 1:
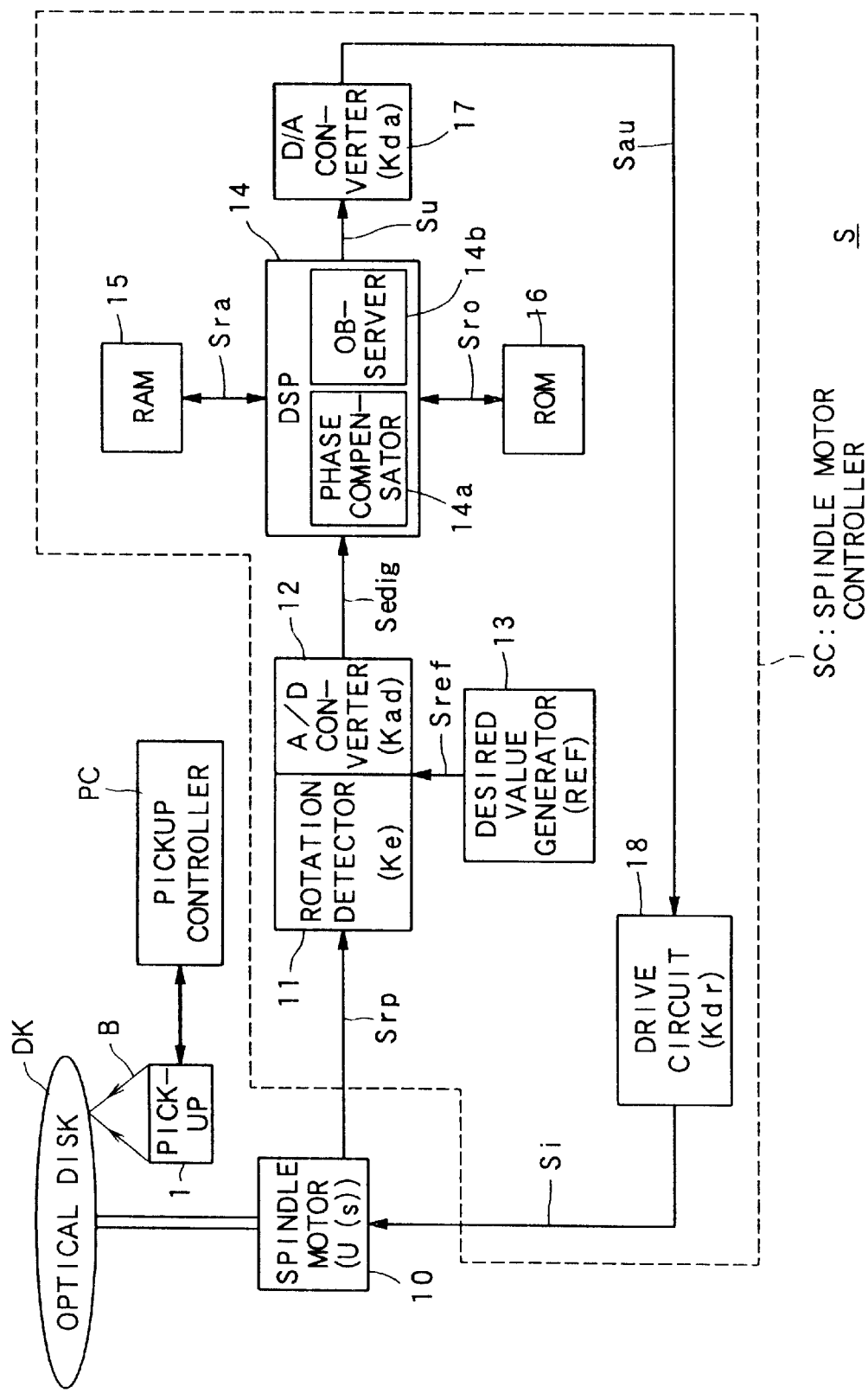
FIG. 1 is a block diagram schematically showing a construction of an information reproducing apparatus according to a first embodiment of the present invention.

First, a construction of an information reproducing apparatus according to the first embodiment will be described below with reference to FIG. 1 and FIG. 2. FIG. 1 is a block diagram schematically showing a construction of an information reproducing apparatus according to a first embodiment of the present invention, and FIG. 2 is a block diagram showing a detailed construction of a rotation detector shown in FIG. 1.

As shown in FIG. 1, an information reproducing apparatus S of the first embodiment includes a pickup 1, a pickup controller PC, a spindle motor 10, and a spindle motor controller SC.

The spindle motor controller SC includes a rotation detector 11, an analog to digital (A/D) converter 12, a desired value generator 13, a DSP (Digital Signal Processor) 14, a RAM (Random Access Memory) 15, a ROM (Read Only Memory) 16, a digital to analog (D/A) converter 17, and a drive circuit 18.

Figure 2:
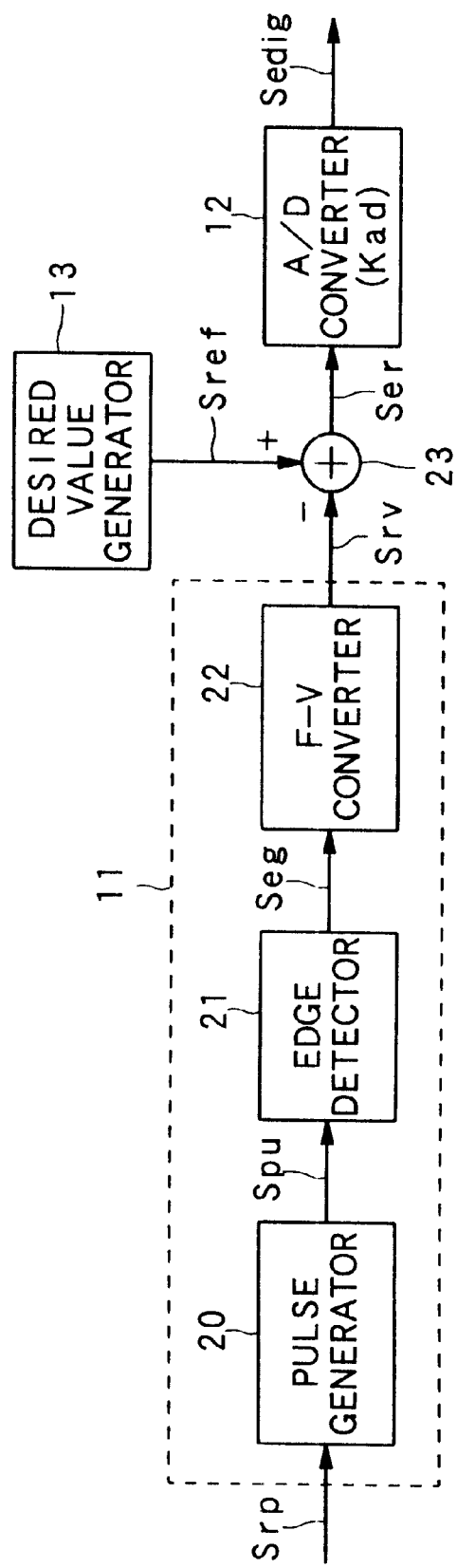
FIG. 2 is a block diagram showing a detailed construction of a rotation detector according to the first embodiment.

As shown in FIG. 2, the rotation detector 11 includes a pulse generator 20, an edge detector 21, an F–V (frequency to voltage) converter 22, and a subtracter 23.

Moreover, as shown in FIG. 1, the DSP 14 is provided with a phase compensator 14a and an observer 14b. The phase compensator 14a and the observer 14b are realized as a function of the DSP 14 when the DSP 14 is operated on the basis of a control program stored in the ROM 16. In this case, these observer 14b and phase compensator 14a may be individually realized as an independent circuit.

FIG. 1 shows only part relating to servo control according to the present invention in the information reproducing apparatus S. In addition to the members shown in FIG. 1, the actual information reproducing apparatus S includes a reproduction processing section for reproducing information recorded in an optical disk DK on the basis of a detection signal from the pickup 1, a display section for displaying an operating state of the information reproducing apparatus S or an operating section for inputting a process for executing the information reproducing apparatus S.

Next, the following is a description on a basic operation.

First, the pickup 1 irradiates an information recording surface of the optical disk DK with a light beam B, and then, generates a detection signal on the basis of a reflected light of the light beam.

At this time, the irradiation position of the light beam B and the focal position of the light beam B are controlled by the objective lens (not shown) installed in the pickup 1. The pickup controller PC moves the objective lens in the direction perpendicular to and parallel to the information recording surface of the optical disk DK. Then, the pickup controller PC adjusts the focal position of the light beam B. In such a manner, a focus servo control and tracking servo control are carried out.

The spindle motor 10 rotatably drives the optical disk on the basis of a drive signal Si while generating a rotational frequency signal Srp indicative of a rotational frequency, and then, outputs the rotational frequency signal Srp to the rotation detector 11. In this case, the spindle motor 10 is equivalent to a controlled system U(s) shown in FIG. 3 and FIG. 5.

Subsequently, the rotation detector 11 detects a rotational frequency of the spindle motor 10 on the basis of the rotational frequency signal Srp. An output voltage value of the rotation detector 11 is changed when the rotational frequency of the spindle motor 10 is changed by a unit rotational frequency. This output voltage value indicates a rotational frequency detection sensitivity in the rotation detector 11, and this rotational frequency detection sensitivity is equivalent to a rotational detection sensitivity Ke (Volt/Hz) shown in FIG. 3 and FIG. 5.

Simultaneously, the desired value generator 13 generates and outputs a desired value signal Sref indicative of a desired value of the rotational frequency of the spindle motor 10. The desired value signal Sref is equivalent to a desired value REF shown in FIG. 3 and FIG. 5.

The A/D converter 12 converts a rotational frequency error, which is an analog signal obtained by subtracting an output signal value of the rotation detector 11 from the desired value signal Sref, into a digital signal, thereby generating a digital error signal Sedig, and then, outputs it to the DSP 14. The rotational frequency error is equivalent to an error er shown in FIG. 3 and FIG. 5. Moreover, the digital error signal Sedig is equivalent to a digital error EDIG shown in FIG. 3 and FIG. 5. A conversion sensitivity of the A/D converter 12 (i.e., a digital value corresponding to a unit voltage in rotational frequency error) is equivalent to a conversion sensitivity Kad (digit/Volt) shown in FIG. 3 and FIG. 5.

Next, the DSP 14 generates a manipulated signal Su for driving the drive circuit 18 by a digital operation of the phase compensator 14a and the observer 14b on the basis of the digital error signal Sedig, and then, outputs the manipulated signal Su to the D/A converter 17. At this time, the DSP 14 reads out a control program stored in the ROM 16 as a ROM signal Sro in advance, and then, performs a function as the phase compensator 14a and the observer 14b on the basis of the control program. Further, data required for performing the above function is used while being temporarily stored in the RAM 15 as a RAM signal Sra.

The D/A converter 17 converts the manipulated signal Su from a digital signal into an analog signal so as to generate an analog manipulated signal Sau, and then, outputs the analog manipulated signal Sau to the drive circuit 18. In this case, a conversion sensitivity of the D/A converter 17 (i.e., a voltage value corresponding to one digital value) is equivalent to a conversion sensitivity Kda (Volt/digit) shown in FIG. 3 and FIG. 5.

Then, the drive circuit 18 amplifies the analog manipulated signal Sau which is a voltage signal while generating the above drive signal Si having a current value corresponding to the voltage value, and then, outputs the drive signal Si to the spindle motor 10. Accordingly, the spindle motor 10 is driven. In this case, the drive signal Si is equivalent to a drive current i shown in FIG. 3 and FIG. 5. Moreover, a conversion sensitivity of the drive circuit 18 (i.e., a current value of the drive signal Si corresponding to a unit voltage in the analog manipulated signal Sau) is equivalent to a conversion sensitivity Kdr (Ampere/Volt) shown in FIG. 3 and FIG. 5.

Next, an operation of the rotation detector 11 will be described in detail with reference to FIG. 2.

As shown in FIG. 2, the pulse generator 20 generates a pulse signal Spu whose pulse number per unit time is proportional to a rotational frequency of the spindle motor 10 shown by the rotational frequency signal Srp, and then, outputs the pulse signal Spu to the edge detector 21.

Subsequently, the edge detector 21 detects any one of a rise edge or fall edge in each pulse contained in the pulse signal Spu, thereby generating an edge signal Seg, and then, outputs the edge signal Seg to the F–V converter 22.

Then, the F–V converter 22 generates a rotational frequency voltage signal Srv having a voltage value corresponding to the number of rise edge per unit time or the number of fall edge per unit time, on the basis of a rise edge cycle or fall edge cycle in the edge signal Seg, and then, outputs the signal Srv as a feedback signal to one terminal of the subtracter 23.

The subtracter 23 subtracts the rotational frequency voltage signal Srv from the desired value signal Sref obtained from the desired value generator 13, thereby generating an error signal Ser indicative of a rotational frequency error, and then, outputs the error signal Ser to the A/D converter 12.

Figure 3:
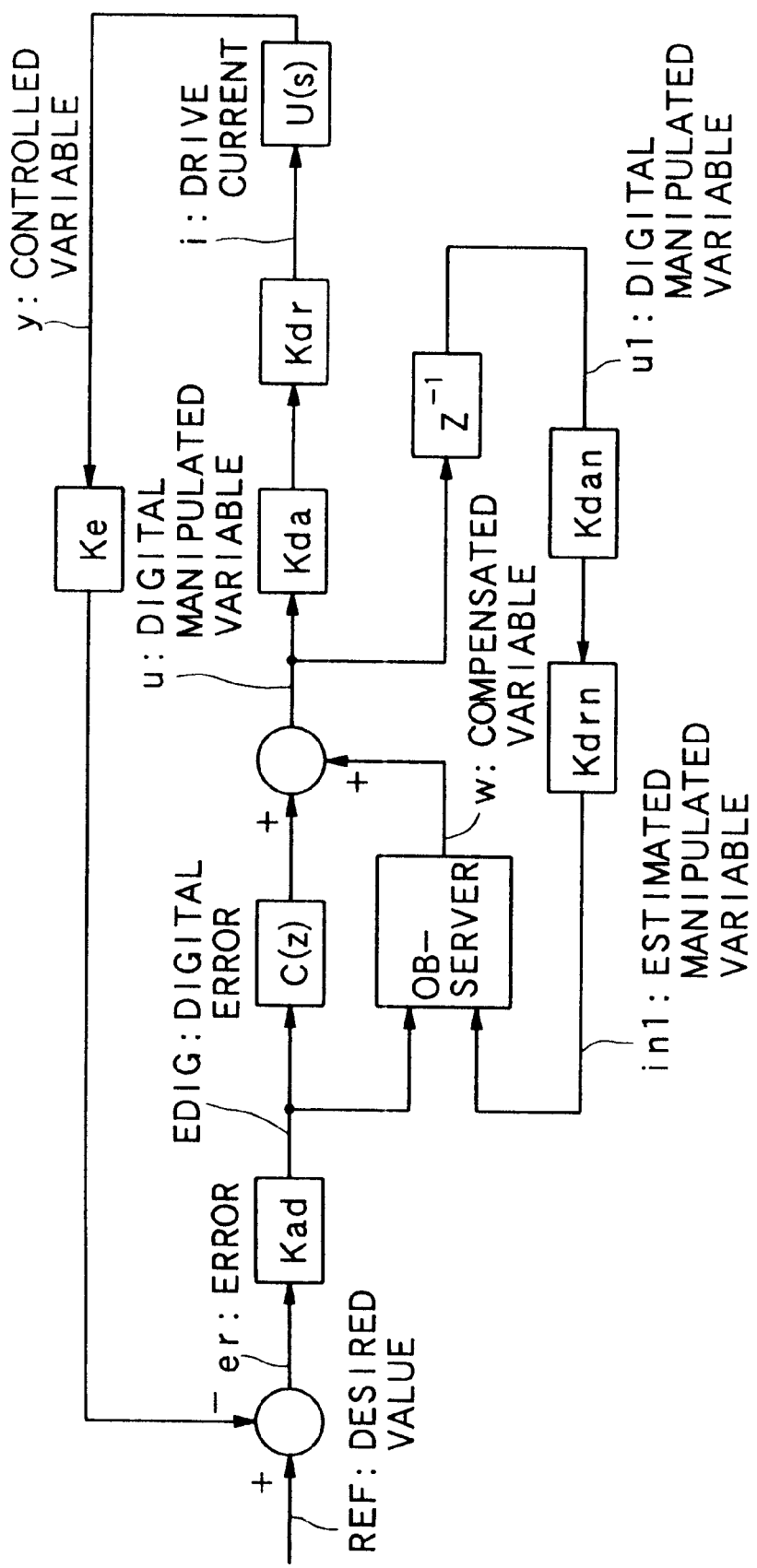
FIG. 3 is a block diagram showing a construction of a control system according to a first embodiment of the present invention.
Figure 4:
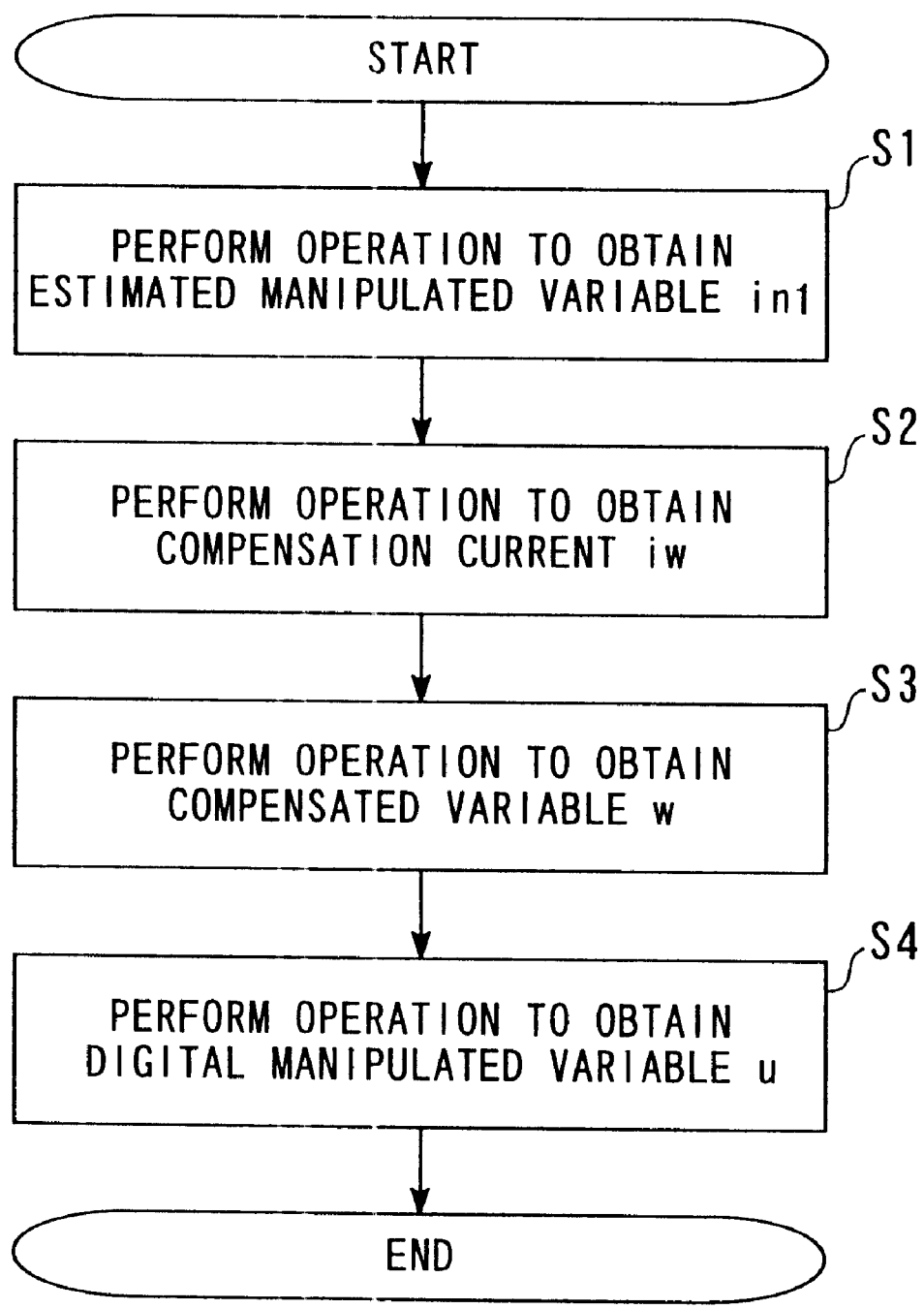
FIG. 4 is a flowchart showing a process by an observer according to a first embodiment of the present invention.
Figure 5:
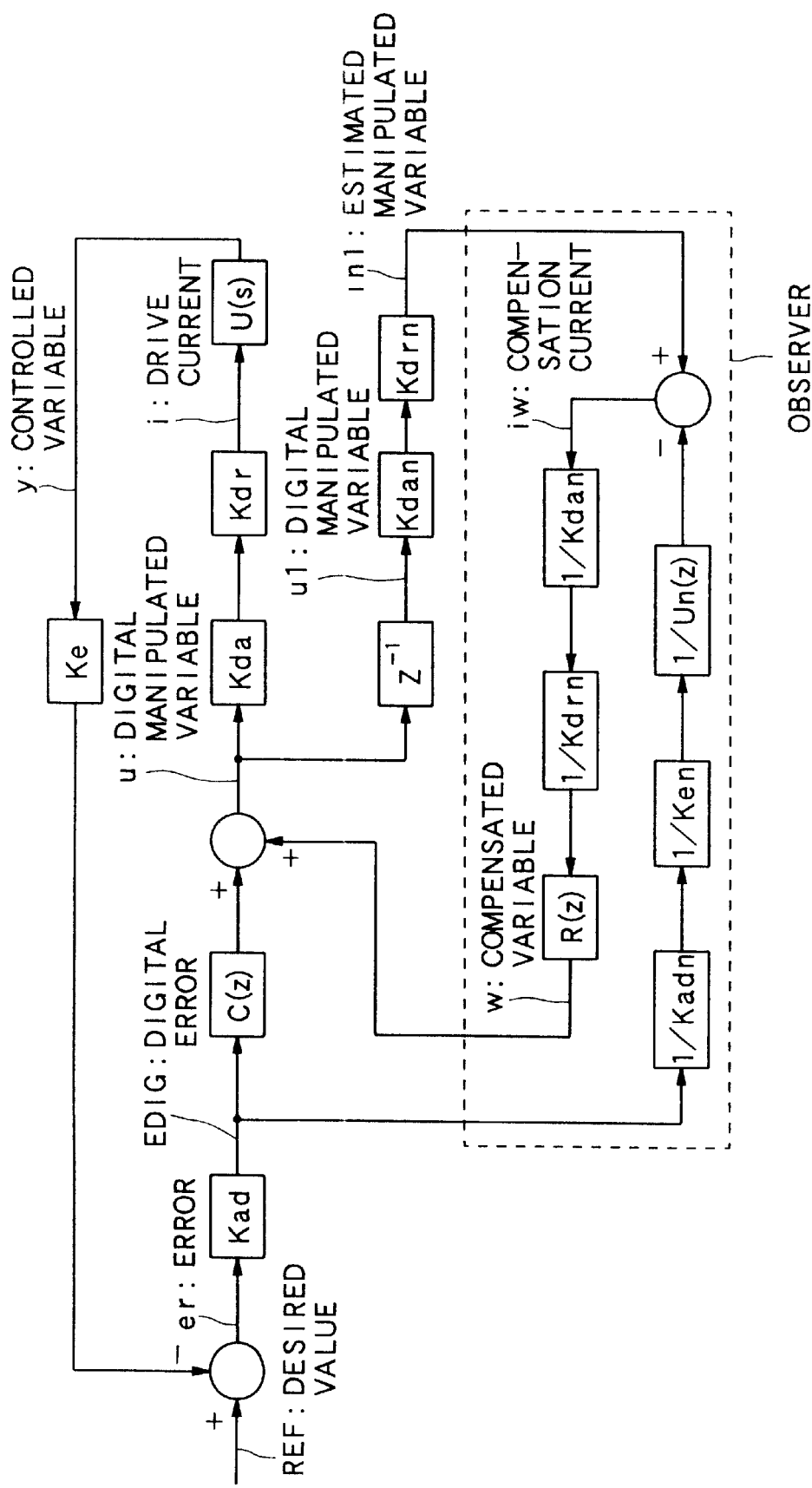
FIG. 5 is a block diagram showing a detailed construction of a control system according to a first embodiment of the present invention.

Next, the following is a description on a feedback control according to the present invention in a control system including the spindle motor controller SC having the aforementioned construction and the spindle motor 10, and this explanation is made with reference to FIG. 3 to FIG. 5.

FIG. 3 is a block diagram showing the whole of feedback control in a control system including the spindle motor controller SC and the spindle motor 10, FIG. 4 is a flowchart showing a process by an observer in the control system, and FIG. 5 is a block diagram showing the whole of the control system and including a block diagram showing internal elements of the observer 14b. In FIG. 3 and FIG. 5, the same reference numerals are used to designate the same elements as those in the conventional feedback system shown in FIG. 13, and the detailed explanation is omitted with respect to the same elements.

First, in the first embodiment, the controlled system U(s) is the spindle motor 10; therefore, the controlled variable is a rotational frequency of the spindle motor 10.

Now, when a transfer function of the spindle motor 10 approximates to a first-order lag system, the following equation is formed.

$$U(s)=Km/(1+Tm \times s)$$

where, Km (Hz/Ampere) is a gain of the spindle motor 10, and Tm(sec) is a time constant of the spindle motor 10.

Next, Kmn is set as a nominal value of the gain Km and Tmn is set as a nominal value of the time constant Tm, and the transfer function of the spindle motor 10 is converted into a digital system as follows.

$$Un(z)=Kmn \times (1-Kpn)/(1-Kpn \times z^{-1})$$

where, Kpn is a coefficient relating to a pole frequency, and more specifically, is expressed as exp (−T/Tmn). Moreover, T(sec) is a sampling period in digital processing, and an operation expressed by "$\times z^{-1}$" is an operation for obtaining a variable before one sample timing.

On the other hand, a nominal value of the rotation detection sensitivity Ke (Volt/Hz) in the rotation detector 11 is set as Ken, a nominal value of the conversion sensitivity Kad (digit/Volt) in the A/D converter 12 is set as Kadn, a nominal value of the conversion sensitivity Kda (Volt/digit) in the D/A converter 17 is set as Kdan, and a nominal value of the conversion sensitivity Kdr (Ampere/Volt) in the drive circuit 18 is set as Kdrn. In this case, in the feedback control system of the first embodiment, a digital manipulated variable u1 which is a digital manipulated variable u before one sample timing is obtained, and then, the digital manipulated variable u1 is multiplied by the nominal values Kdan and Kdrn of the conversion sensitivity of the D/A converter 17 and the drive circuit 18, thereby obtaining an estimated manipulated variable in1, and then, the estimated manipulated variable in1 is used as one input of the observer, and, on the other hand, the digital error EDIG is used as the other input of the observer.

Next, an operation of the observer 14b will be described in detail with reference to FIG. 4 and FIG. 5. In an example shown in FIG. 4 and FIG. 5, an operation based on an inverse function of characteristic equation indicating a controlled system is realized in the feedback control system of the first embodiment. The above inverse function is indicative of an inverse transfer characteristic of the controlled system U(s), and is expressed as 1/U(s).

In the case of realizing the above observer by this inverse function, an operation as shown in FIG. 4 is carried out in the feedback control system including the observer 14b.

More specifically, as shown in FIG. 4, first, an operation to obtain the estimated manipulated variable in1 is performed in accordance with the following equation, using the digital manipulated variable u1 before one sample timing, the nominal value kdan of the conversion sensitivity Kda of the D/A converter 17, and the nominal value Kdrn of the conversion sensitivity Kdr of the drive circuit 18 (step S1).

$$in1 = Kdrn \times Kdan \times u1$$

At this time, the digital manipulated variable u1 before one sample timing is calculated as the following equation.

$$u1 = z^{-1} \times u$$

In this equation, u is a digital manipulated variable of current sample timing (input value of the D/A converter 17). Moreover, an operation "$\times z^{-1}$" is equivalent to carrying out an operation exp(-s×T). Actually, this operation is realized by storing the digital manipulated variable u1 before one sample timing in the RAM 15, and reading it therefrom.

As shown in FIG. 5, a controlled variable y is converted into the digital error EDIG by using the following equation, and then, is output from the A/D converter 12.

$$REF - y \times Ke = er$$

$$Kad \times er = EDIG$$

Next, an operation to obtain a compensation current iw is performed in accordance with the following equation, using a digital nominal value Un(z) of the controlled system U(s), the nominal value Ken of the conversion sensitivity Ke of the rotation detector 11, the conversion sensitivity Kadn of the A/D converter 12, the digital error EDIG and estimated manipulated variable in1 (step S2).

$$iw = in1 - EDIG/(Ken \times Kadn \times Un(z))$$

Figure 13:
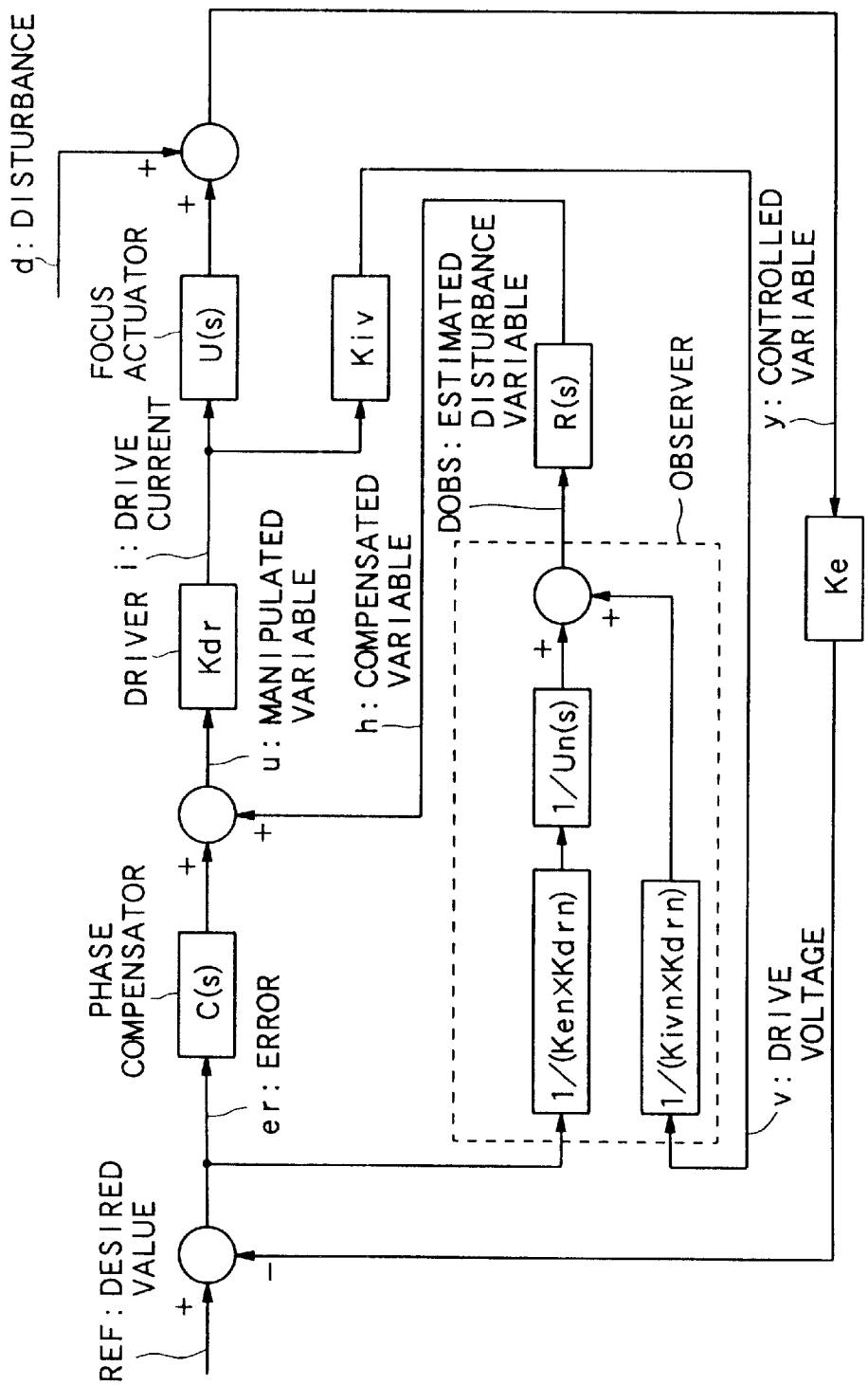
FIG. 13 is a block diagram showing a construction of a control system using a conventional observer.

At this time, the compensation current iw contains the estimated disturbance variable DOBS (FIG. 13).

Subsequently, an operation to obtain a compensated variable w (compensated variable of manipulated variable u) is performed in accordance with the following equation, using the compensation current iw, the nominal value Kdan, the nominal value Kdrn and R(z) indicating a robust filter (not shown) included in the DSP 14 (step S3).

$$w = \{1/(Kdan \times Kdrn)\} \times R(z) \times iw$$

Finally, an operation to obtain the digital manipulated variable u of the current sample timing is performed in accordance with the following equation, using the digital error EDIG, the compensated variable w and C(z) indicating a transfer characteristic of the phase compensator 14a (step S4).

$$u = EDIG \times C(z) + w$$

This digital manipulated variable u is supplied to the D/A converter 17.

Thereafter, the digital manipulated variable u is converted into an analog signal by the D/A converter 17 so as to generate an analog manipulated signal Sau, and then, the drive circuit 18 is driven using the analog manipulated signal Sau so as to generate a drive signal Si. The drive signal Si is output to the spindle motor 10; as a result, the spindle motor 10 is rotated.

In this case, the following equation is formed as an operation in the robust filter, for example.

$$R(z) = Krg/(1 - Krp \times z^{-1})$$

where Krg is a gain constant of the robust filter, and Krp is a pole constant (0<Krp<1) thereof.

Moreover, the following equation is formed as an operation in the phase compensator 14a, for example.

$$C(z) = Kcg \times (1 - Kc0 \times z^{-1})/(1 - Kcp \times z^{-1})$$

where Kcg is a gain constant of the phase compensator 14a, Kc0 is a coefficient at a zero point thereof, and Kcp is a pole coefficient (0<Kc0<Kcp<1) thereof.

In the feedback system shown in FIG. 3 and FIG. 5, the estimated manipulated variable in1 has been operated using the digital manipulated variable u1 before one sample timing. This principle will be described below.

To obtain the ideal estimated manipulated variable in1, the operation is performed using the digital manipulated variable u of the current sample timing. However, in fact, it is impossible to obtain the digital manipulated variable u of the current sample timing when the operation to obtain the estimated manipulated variable in1 is actually performed, because the digital manipulated variable u of the current sample timing is obtained after all of the operations (step 1 through step 4 in FIG. 4) end. For this reason, the digital manipulated variable u1 before one sample timing is used in place of the digital manipulated variable u. This is based on the premise that the digital manipulated variable u has no rapid change during one sample timing.

In the feedback control system, assuming that the manipulated variable u at the current sample timing is directly used in the observer, an A/D converter for digitizing the drive current i must be needed. On the contrary, in the first embodiment, since the digital manipulated variable u1 before one sample timing is used in place of the digital manipulated variable u of the current sample timing, the A/D converter for digitizing the drive current i is not needed. In the case where a sampling frequency is sufficiently higher as compared with a servo area of the feedback control system, a one sample timing lag is no problem.

As described above, according to the first embodiment, the spindle motor controller SC carried out a feedback control while estimating a disturbance applied to the spindle motor 10 on the basis of the digital manipulated variable u1 and the digital error EDIG. This serves to dispense the A/D converter for digitizing the drive current i. Accordingly, it is possible to simplify the construction of the spindle motor controller SC, and to reduce a production cost, and further, to reduce an integration area.

Further, the disturbance corresponding to the current sample timing is estimated using the digital manipulated variable u1 before one sample timing and the error EDIG of the current sample timing; therefore, an actual disturbance can be effectively suppressed.

Furthermore, the disturbance is estimated on the basis of the estimated manipulated variable in1 generated by multiplying the nominal value Kdan of the conversion sensitivity Kda of the D/A converter 17 and the nominal value Kdrn of the conversion sensitivity Kdr of the drive circuit 18 with respect to the digital manipulated variable u1 before one sample timing; therefore, the disturbance can be accurately estimated.

The above first embodiment has described the case where the rotation detector 11 and the A/D converter 12 are used in order to generate the digital error signal Sedig on the basis of the rotational frequency signal Srp from the spindle motor 10. In addition, as shown in FIG. 6, the digital error signal Sedig may be generated from the rotational frequency signal Srp by a rotation detector 11' including a pulse generator 20, an edge detector 21 and a period detecting counter 25 and by a period-frequency converter 26.

Figure 6:
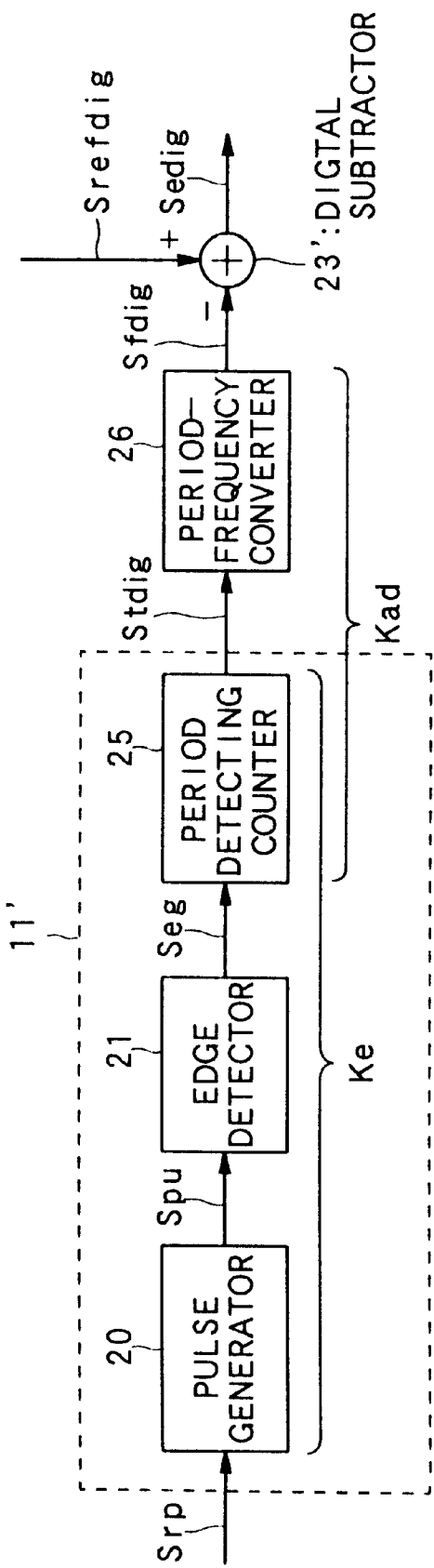
FIG. 6 is a block diagram showing another construction of a rotation detector in the first embodiment.

More specifically, as shown in FIG. 6, the rotational frequency signal Srp is generated according to the same manner as the aforementioned case (FIG. 2). Then, the period detecting counter 25 detects any one of the rise edge cycle and the fall edge cycle of the rotational frequency signal Srp, thereby generating the cycle signal Stdig, and then, outputs this signal to the period-frequency converter 26.

Then, the period signal Stdig is converted into a frequency by the period-frequency converter 26 so as to generate the corresponding frequency signal Sfdig, and the frequency signal Sfdig is supplied to one input terminal of a digital subtracter 23'. Further, the frequency signal Sfdig is subtracted from a desired value signal Srefdig (,which is a digital signal,) from the desired value generator 13, and then, the digital error signal Sedig, which is a difference of the above subtraction, is generated and output.

In this manner, the pulse signal Spu may be directly converted into a digital value so that the digital error signal Sedig can be obtained.

In the above first embodiment, the desired value REF has been applied as an analog signal. The desired value REF is converted into a digital signal in advance, and thereafter, may be applied as a desired value signal Srefdig in a manner shown in the following equation.

$$y \times Ke = er$$

$$refdig - Kad \times er = EDIG$$

Moreover, in the above first embodiment, the manipulated signal Su (digital manipulated variable u) has been converted into an analog manipulated signal Sau using the D/A converter 17. Alternatively, the analog manipulated signal Sau may be generated from the manipulated signal Su by a so-called PWM (Pulse Width Modulation) circuit or the like.

(II) Second Embodiment

Figure 7:
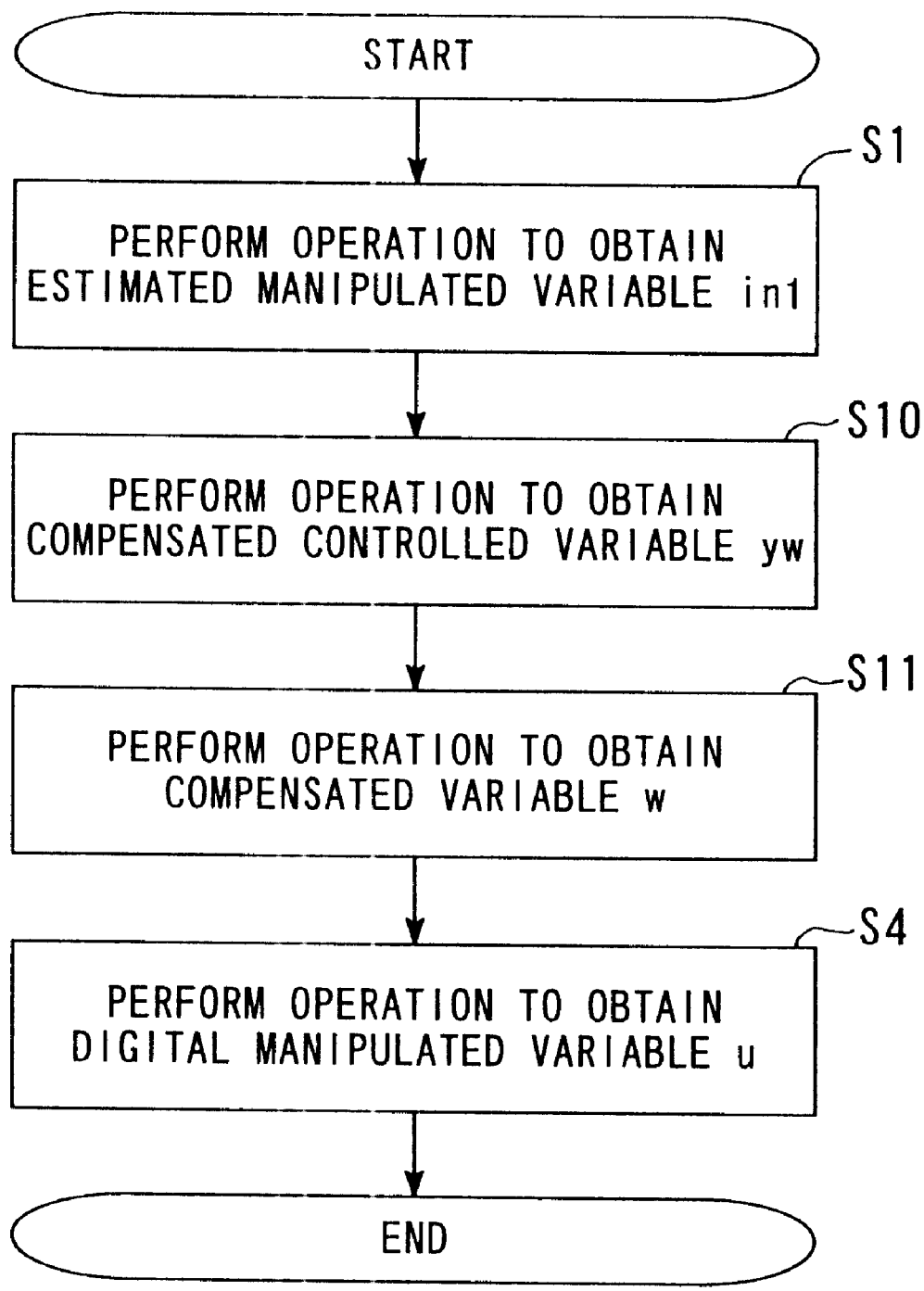
FIG. 7 is a flowchart showing a process by an observer according to a second embodiment of the present invention.
Figure 8:
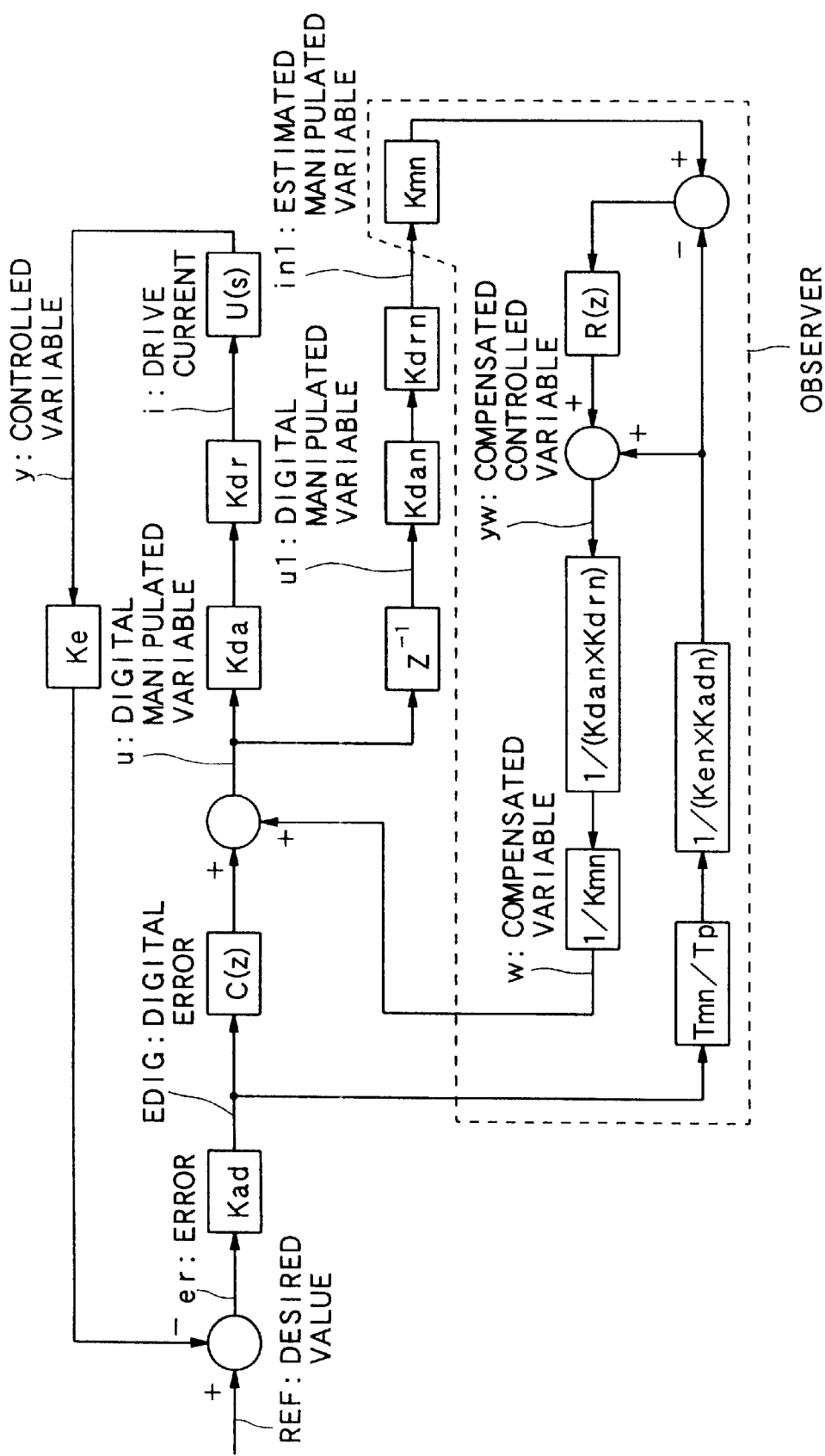
FIG. 8 is a block diagram showing a construction of a control system according to a second embodiment of the present invention.

Next, a second embodiment of the present invention will be described with reference to FIG. 7 and FIG. 8. FIG. 7 is a flowchart showing a process by an observer of a second embodiment, and FIG. 8 is a block diagram showing a construction of a control system including a block diagram showing internal elements of the observer of the second embodiment.

The above first embodiment has described the case where the observer 14b is operated on the basis of an inverse function of a controlled system. In this second embodiment, a so-called Gopinath minimal-order observer is used as the observer 14b.

An operation of feedback control system of the second embodiment is the same as the case of the spindle motor controller Sc of the first embodiment except an internal operation of the observer 14. Therefore, explanation with respect to the same elements is omitted.

The above Gopinath minimal-order observer is one of observers designed according to a Gopinath method which is general as an observer design method.

The following is a description on a construction and operation of the feedback control system of the second embodiment in the case where the Gopinath minimal-order observer is used as the observer 14b.

In the feedback control system including the observer 14b functioning as the Gopinath minimal-order observer, as shown in FIG. 7, first, in the same manner as the case of the first embodiment, an operation to obtain an estimated manipulated variable in1 is performed in accordance with the following equation, using the digital manipulated variable u1 before one sample timing (step S1).

$$in1 = Kdrn \times Kdan \times u1$$

Next, a controlled variable y is converted into the digital error EDIG by using the following equation, and then, is output from the A/D converter 12.

$$REF - y \times Ke = er$$

$$Kad \times er = EDIG$$

Subsequently, based on the above digital error EDIG and the estimated compensated variable in1, an operation to obtain a compensated controlled variable yw is performed in accordance with the following equation, using the robust filter R(z) included in the DSP 14, the nominal value Kmn of a gain Km of the spindle motor 10, the nominal value Tmn of the time constant Tm of the spindle motor 10, the above nominal values Ken, Kadn, Kdrn and a time constant Tp of the robust filter (step S10).

$$yw = R(z) \times \{in1 \times Kmn - EDIG \times (Tmn/Tp)/(Ken \times Kadn)\} + EDIG \times (Tmn/Tp)/(Ken \times Kadn)$$

In this case, the following equation shows a relationship between the time constant Tp of the robust filter and the pole constant Krp of the robust filter in the first embodiment.

$$Krp = \exp(-T/Tp)$$

At this time, the compensated controlled variable yw contains the estimated disturbance variable DOBS (FIG. 13).

Next, on the basis of the above compensated controlled variable yw, the nominal value Kmn, the nominal value Kdan of the conversion sensitivity Kda of the D/A converter 17 and the nominal value Kdrn of the conversion sensitivity Kdr of the drive circuit 18, an operation to obtain a compensated variable w is performed in accordance with the following equation (step S11).

$$w = \{1/(Kmn \times Kdan \times Kdrn)\} \times yw$$

Finally, on the basis of the digital error EDIG and the above compensated variable w, an operation to obtain a digital manipulated variable u of the current sample timing is performed in accordance with the following equation, and then, is output to the D/A converter 17 (step S4).

$$u = EDIG \times C(z) + w$$

Thereafter, the digital manipulated variable u is converted into an analog signal by the D/A converter 17 so that an analog manipulation signal Sau is generated, and then, the drive circuit 18 is driven by the analog manipulation signal Sau so as to generate the above drive signal Si, and outputs it to the spindle motor 10. Accordingly, the spindle motor 10 is rotated.

According to the second embodiment, in the information reproducing apparatus including the feedback control system using the Gopibath minimal-order observer, the similar effect as the first embodiment can be obtained.

Moreover, the second embodiment has described the case of estimating the disturbance corresponding to the current sample timing using the digital manipulated variable u1 before one sample timing and the error EDIG of the current sample timing. In addition, the digital manipulated variable u has been delayed for one sample timing so as to obtain the digital manipulated variable u1. In place of this construction, the substantially same effect as the above second embodiment can be also obtained from the following construction; more specifically, as shown in FIG. 8, a delay equipment (shown by "$z^{-1}$") for delaying each operated value for one sample timing is inserted between the subtracter in the observer and operation points (between controlled elements) up to the digital manipulated variable u.

(III) Third Embodiment

Next, a third embodiment of the present invention will be described with reference to FIG. 4, FIG. 9 and FIG. 10. The following third embodiment shows the case where the present invention is applied to a process by a pickup controller PC for carrying out a focus servo control of the pickup 1 included in the information reproducing apparatus S shown in FIG. 1.

First, a construction of the pickup controller PC of the third embodiment will be described with reference to FIG. 9. FIG. 9 is a block diagram schematically showing a construction of the pickup controller PC of the third embodiment.

Figure 9:
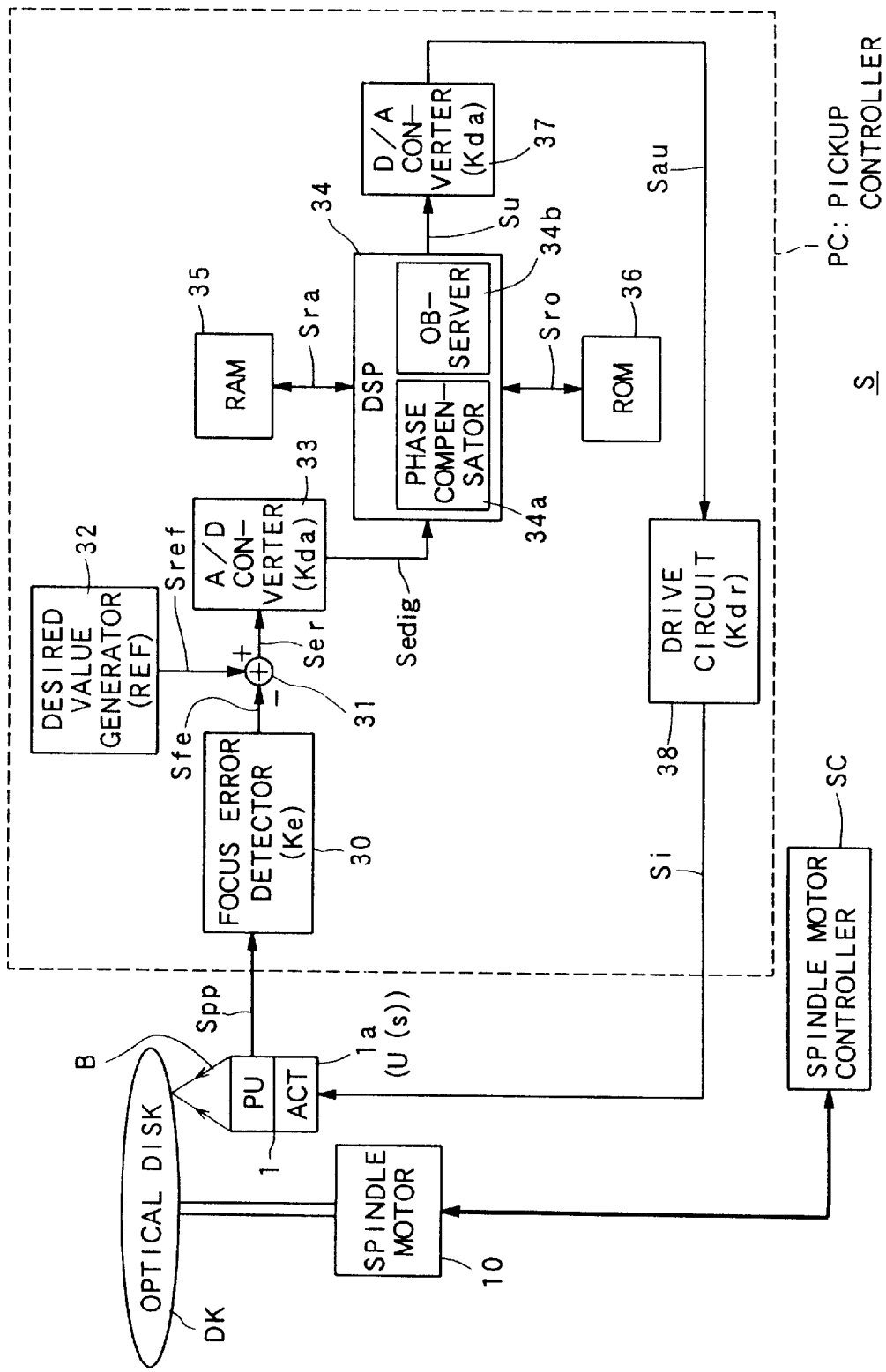
FIG. 9 is a block diagram schematically showing a construction of an information reproducing apparatus according to a third embodiment of the present invention.

As shown in FIG. 9, the pickup controller PC of the information reproducing apparatus S includes a focus error detector 30, a subtracter 31, a desired value generator 32, an A/D converter 33, a DSP 34, a RAM 35, a ROM 36, a D/A converter 37, and a drive circuit 38.

The DSP 34 is provided with a phase compensator 34*a* and an observer 34*b* in the same manner as the case of the first embodiment.

Moreover, the pickup (PU) 1 is provided with an actuator (ACT) 1*a* for moving an objective lens (not shown) in the direction perpendicular to an information recording surface of an optical disk DK.

Next, an operation of the pickup 1 will be described below.

First, the pickup 1 irradiates the information recording surface of the optical disk DK with a light beam B, while carrying out a tracking servo control and a focus servo control based on the drive signal Si. Further, the pickup 1 generates a detection signal Spp on the basis of a reflected light of the light beam, and then, outputs the detection signal Spp to a focus error detector 30. In this case, the actuator 1*a* is equivalent to a controlled system U(s) shown in FIG. 10.

The detection signal Spp is supplied to the focus error detector 30, and is used in an information reproducing process of the reproduction processing section described in the first embodiment.

Next, the focus error detector 30 generates a focus error signal Sfe indicative of a shift in the direction perpendicular to the information recording surface of the optical disk DK between the focal position of the light beam B and the position on the information recording surface, on the basis of the detection signal Spp, and then, outputs the focus error signal Sfe to one terminal of the subtracter 31. In this case, an error signal detecting sensitivity of the focus error detector 30 (i.e., an output voltage value of the focus error detector 30, which is changed when the objective lens is moved by a unit distance) is equivalent to a position detecting sensitivity Ke (Volt/m) shown in FIG. 10.

Moreover, as a focus error detecting method in the focus error detector 30, a so-called SSD (Spot Size Detection) method or astigmatism method may be used, for example.

Simultaneously, the desired value generator 32 generates and outputs a desired value signal Sref indicative of a position in which the objective lens should be positioned (i.e., a position in the direction perpendicular to the information recording surface on which the objective lens should be positioned so that the focal position of the light beam B is positioned onto the information recording surface). In this case, the desired value signal Sref is equivalent to a desired value REF shown in FIG. 10.

Then, the subtracter 31 generates an error signal Ser indicative of a positional error obtained by subtracting a value of the focus error signal Sfe from a value of the desired value signal Sref, and then, outputs the error signal Ser to the A/D converter 33. This positional error is a positional error relating to a focal position of the light beam B, and is equivalent to an error er shown in FIG. 10.

The A/D converter 33 converts the error signal Ser from an analog signal into a digital signal so that a digital error signal Sedig is generated, and then, outputs the digital error signal Sedig to the DSP 34. In this case, a conversion sensitivity of the A/D converter 33 (i.e., a digital value corresponding to a unit error in the positional error) is equivalent to a conversion sensitivity Kad (digit/m) of the A/D converter 33 in FIG. 10. Moreover, the digital error signal Sedig is equivalent to a digital error EDIG shown in FIG. 10.

Next, in the same manner as the case of the DSP 14 of the first embodiment, the DSP 34 generates a manipulated signal Su for driving the drive circuit 38 by a digital operation of the phase compensator 34*a* and the observer 34*b* based on the digital error signal Sedig, and then, outputs the signal Su to the D/A converter 37. At this time, the DSP 34 performs a function as the phase compensator 34*a* and the observer 34*b* on the basis of a control program while reading the control program stored in the ROM 36 as a ROM signal Sro in advance. Moreover, a data required for performing this function is temporarily stored as a RAM signal Sra in the RAM 35.

The D/A converter 37 converts the manipulated signal Su from a digital signal into an analog signal so as to generate an analog manipulated signal Sau, and then, output the signal Sau to the drive circuit 38. In this case, a conversion sensitivity of the D/A converter 37 (i.e., a voltage value corresponding to one digital value) is equivalent to a conversion sensitivity Kda (Volt/digit) of the D/A converter 37 shown in FIG. 10.

The driver circuit 38 amplifies the analog manipulated signal Sau which is a voltage signal, and generate a drive signal Si having a current value corresponding to the voltage value of the amplified manipulated signal Sau, and then, outputs the drive signal Si to the actuator 1*a*, and thus, the actuator 1*a* is driven so as to move the objective lens. In this case, the drive signal Si is equivalent to a drive current i shown in FIG. 10. Moreover, a conversion sensitivity of the driver circuit 38 (i.e., a current value of the drive current Si corresponding to a unit voltage of the analog manipulated signal Sau) is equivalent to a conversion sensitivity Kdr (Ampere/Volt) of the drive circuit 18 shown in FIG. 10.

Next, a feedback control according to the present invention in a control system including the pickup controller PC having the above construction and the actuator 1a will be described below with reference to FIG. 4 and FIG. 10.

Figure 10:
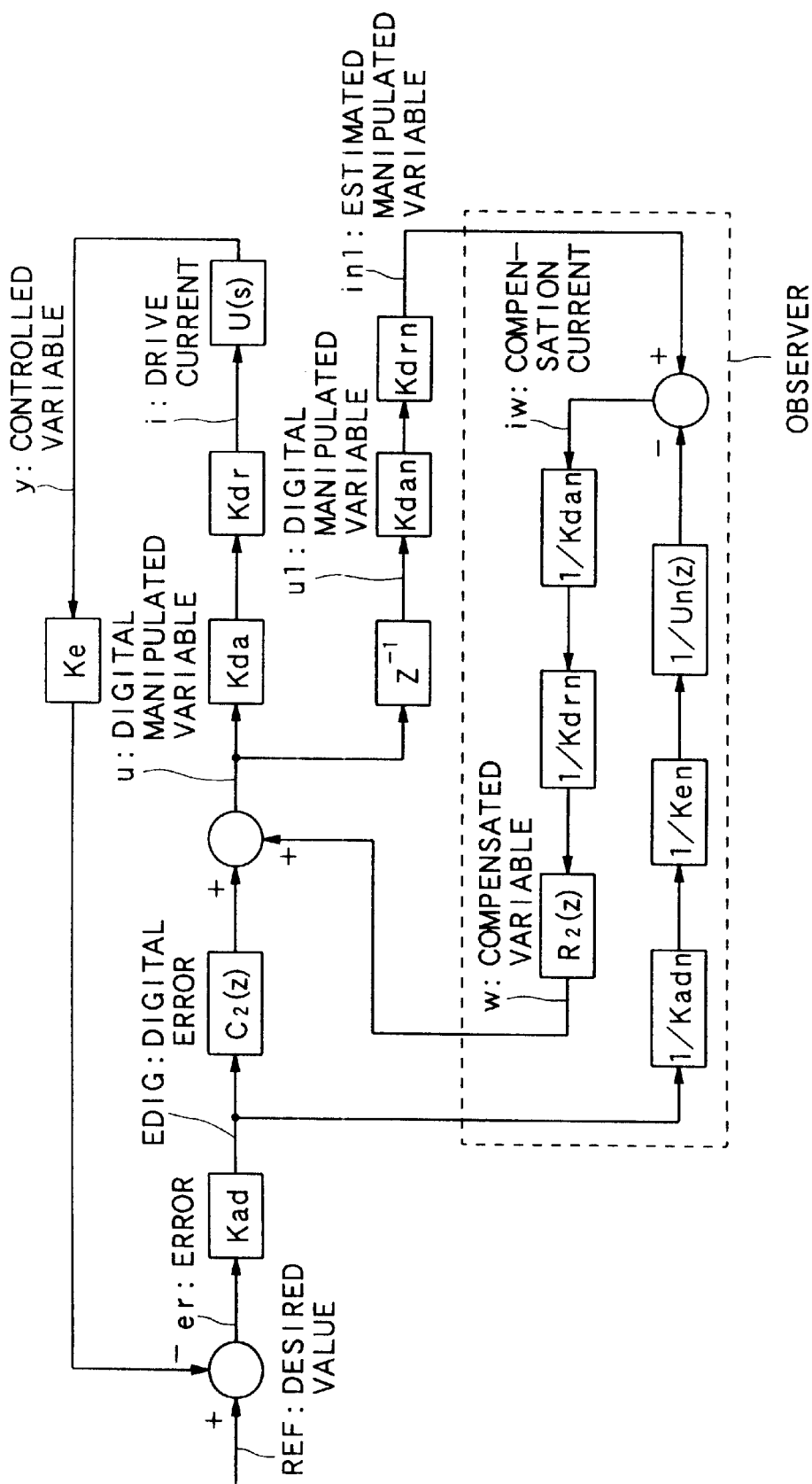
FIG. 10 is a block diagram showing a detailed construction of a control system according to a third embodiment of the present invention.

FIG. 10 is a block diagram showing the whole construction of feedback control in the control system including the pickup controller PC and the actuator 1a, and including a block diagram showing internal elements of the observer 34b. In this third embodiment, a disturbance estimating process by the observer 34b is basically the same as the observer 14b of the first embodiment, and therefore, the flowchart shown in FIG. 4 is used as a flowchart for explaining the process by the observer 34b. In FIG. 10, the same reference numerals are used to designate the same controlled elements as those in the conventional feedback control system shown in FIG. 13, and therefore, the details with respect to the same elements are omitted.

In the third embodiment, a controlled system U(s) is the actuator 1a; therefore, a controlled variable y is a position of the actuator 1a (or the objective lens) in the direction perpendicular to the information recording surface of the optical disk DK.

Now, when a transfer function of the actuator 1a approximates to a second-order lag system, the following equation is formed.

$$U(s) = A \times w^2 / (s^2 + 2 \times k \times w \times s + w^2)$$

where, A is a gain (m/Ampere) of the actuator 1a, k is a viscous braking coefficient of the actuator 1a, and w is a natural vibration frequency (rad/sec) of the actuator 1a.

Further, Kgn is set as a nominal value of a gain constant Kg of the actuator 1a, K1n is set as a nominal value of a primary coefficient K1 of the actuator 1a, and K2n is set as a nominal value of a secondary coefficient K2 of the actuator 1a. Then, the transfer function of the actuator 1a is converted into a digital system as follows.

$$Un(z) = Kgn / (1 + K1n \times z^{-1} + K2n \times z^{-2})$$

On the other hand, a nominal value of the position detecting sensitivity Ke as an error detecting sensitivity in the focus error detector 30 is set as Ken, a nominal value of the conversion sensitivity Kad (digit/Volt) in the A/D converter 33 is set as Kadn, a nominal value of the conversion sensitivity Kda (Volt/digit) in the D/A converter 37 is set as Kdan, and a nominal value of the conversion sensitivity Kdr (Ampere/Volt) in the drive circuit 38 is set as Kdrn. In this case, in the feedback control system of the third embodiment, a digital manipulated variable u1 which is a digital manipulated variable u before one sample timing is obtained, and then, the digital manipulated variable u1 is multiplied by the nominal values Kdan and Kdrn, so that an estimated manipulated variable in1 is obtained. This the estimated manipulated variable in1 is used as one input of the observer. The digital error EDIG is used as the other input of the observer.

Next, an operation of the observer 34b will be described in detail with reference to FIG. 4 and FIG. 10. In an example shown in FIG. 4 and FIG. 10, an operation based on the same inverse function of the first embodiment is realized in the feedback control system of the third embodiment.

In the feedback control system including the observer 34b which is adaptable to the use of an inverse function of controlled system, as shown in FIG. 4, first, an operation to obtain the estimated manipulated variable in1 is performed in accordance with the following equation, using the digital manipulated variable u1 before one sample timing, the nominal value kdan of the conversion sensitivity Kda of the D/A converter 37, and the nominal value Kdrn of the conversion sensitivity Kdr of the drive circuit 38 (step S1).

$$in1 = Kdrn \times Kdan \times u1$$

$$u1 = z^{-1} \times u$$

where u is a digital manipulated variable of the current sample timing (input value of the D/A converter 37).

In this case, a controlled variable y is expressed as a digital error EDIG from the A/D converter 33 as follows.

$$REF - y \times Ke = er$$

$$Kad \times er = EDIG$$

Next, an operation to obtain a compensation current iw is performed in accordance with the following equation, using a digital nominal value Un(z) of the controlled system U(s), the nominal value Ken of the conversion sensitivity Ke of the focus error detector 30 and the nominal value Kadn of the conversion sensitivity Kad of the A/D converter 33, the digital error EDIG and estimated manipulated variable in1 (step S2).

$$iw = in1 - EDIG / (Ken \times Kadn \times Un(z))$$

At this time, the compensation current iw contains the estimated disturbance variable DOBS shown in FIG. 13.

Subsequently, an operation to obtain a compensated variable w is performed in accordance with the following equation, using the compensation current iw, the nominal value Kdan, the nominal value Kdrn and $R_2(z)$ indicating a robust filter included in the DSP 34 (step S3).

$$w = \{1 / (Kdan \times Kdrn)\} \times R_2(z) \times iw$$

Finally, an operation to obtain the digital manipulated variable u of the current sample timing is performed in accordance with the following equation, using the digital error EDIG, the compensated variable w, and $C_2(z)$ indicating a transfer sensitivity of the phase compensator 34a (step S4).

$$u = EDIG \times C_2(z) + w$$

Then, the digital manipulated variable u is supplied to the D/A converter 37.

Thereafter, the digital manipulated variable u is converted into an analog signal by the D/A converter 37 so as to generate an analog manipulated signal Sau, and then, the drive circuit 38 is driven using the analog manipulated signal Sau so as to generate a drive signal Si. The drive signal Si is output to the actuator 1a; as a result, the actuator 1a is driven.

In this case, the following equation is formed as an operation in the robust filter, for example.

$$R_2(z) = \{Krg / (1 - Krp \times z^{-1})\}^2$$

where Krg is a gain constant of the robust filter, and Krp is a pole constant thereof.

Moreover, the following equation is formed as an operation in the phase compensator 34a, for example.

$$C_2(z)=Kp+Ki/(1-z^{-1})+Kd(1-z^{-1})$$

where Kp is a proportional term, Ki is an integral term, and Kd is a differential term.

As described above, according to the third embodiment, the pickup controller PC can obtain the substantially same effect as the first embodiment in the focus servo control with respect to the objective lens included in the pickup 1.

The above third embodiment has described the case where the desired value REF is applied as an analog signal. In addition, similarly to the case of the first embodiment, the desired value REF may be applied as a digital value after being converted from an analog signal to a digital signal in advance.

Further, the above third embodiment has shown the construction such that the manipulated signal Su is converted into the analog manipulated signal Sau by the D/A converter 37. In addition, the analog manipulated signal Sau may be generated from the manipulated signal Su by using a PWM circuit or the like.

Furthermore, the above third embodiment has described the case where the present invention is applied to a focus servo control with respect to the objective lens included in the pickup 1. In addition, the present invention may be applied to a tracking servo control using a tracking servo control using DPD (Differential Phase Detection) method, a three-beam method or the like. Moreover, the present invention may be applied to a slider servo control for moving the pickup 1 to a radial direction of the optical disk DK.

(IV) Fourth Embodiment

Next, a fourth embodiment of the present invention will be described below with reference to FIG. 11 and FIG. 12.

The aforementioned embodiments have described the case where the estimated manipulated variable in1 is operated using the digital manipulated variable u1 before one sample timing in the pickup controller PC or spindle motor controller SC included in the information reproducing apparatus S. In this fourth embodiment, the estimated manipulated variable in1 is obtained by using the compensated variable w1 before one sample timing.

In a feedback control of this fourth embodiment, the physical construction is the same as the aforementioned pickup controller PC or spindle motor controller SC, and therefore, the details with respect to the same elements are omitted.

Figure 11:
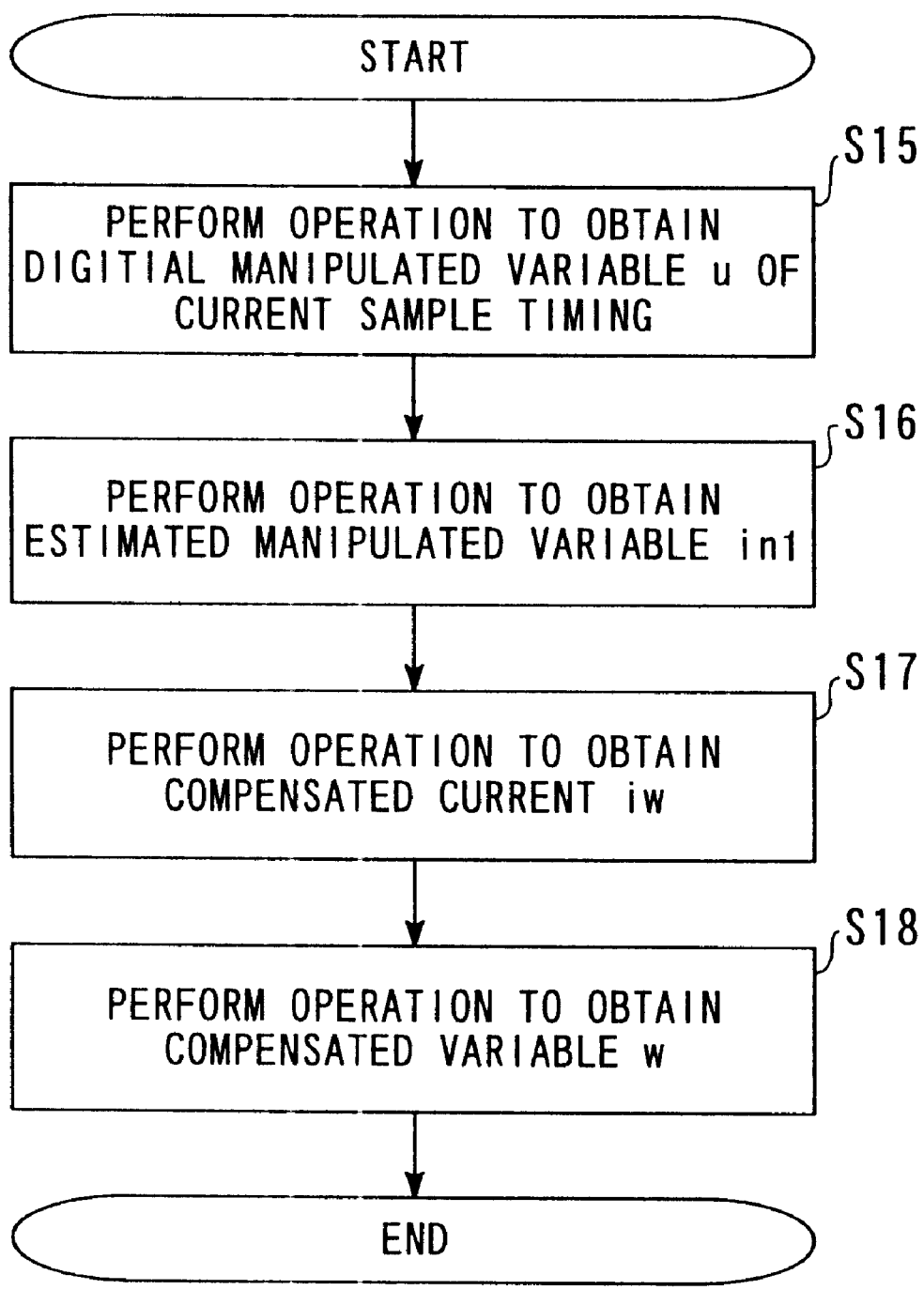
FIG. 11 is a flowchart showing a process by an observer according to a fourth embodiment of the present invention.
Figure 12:
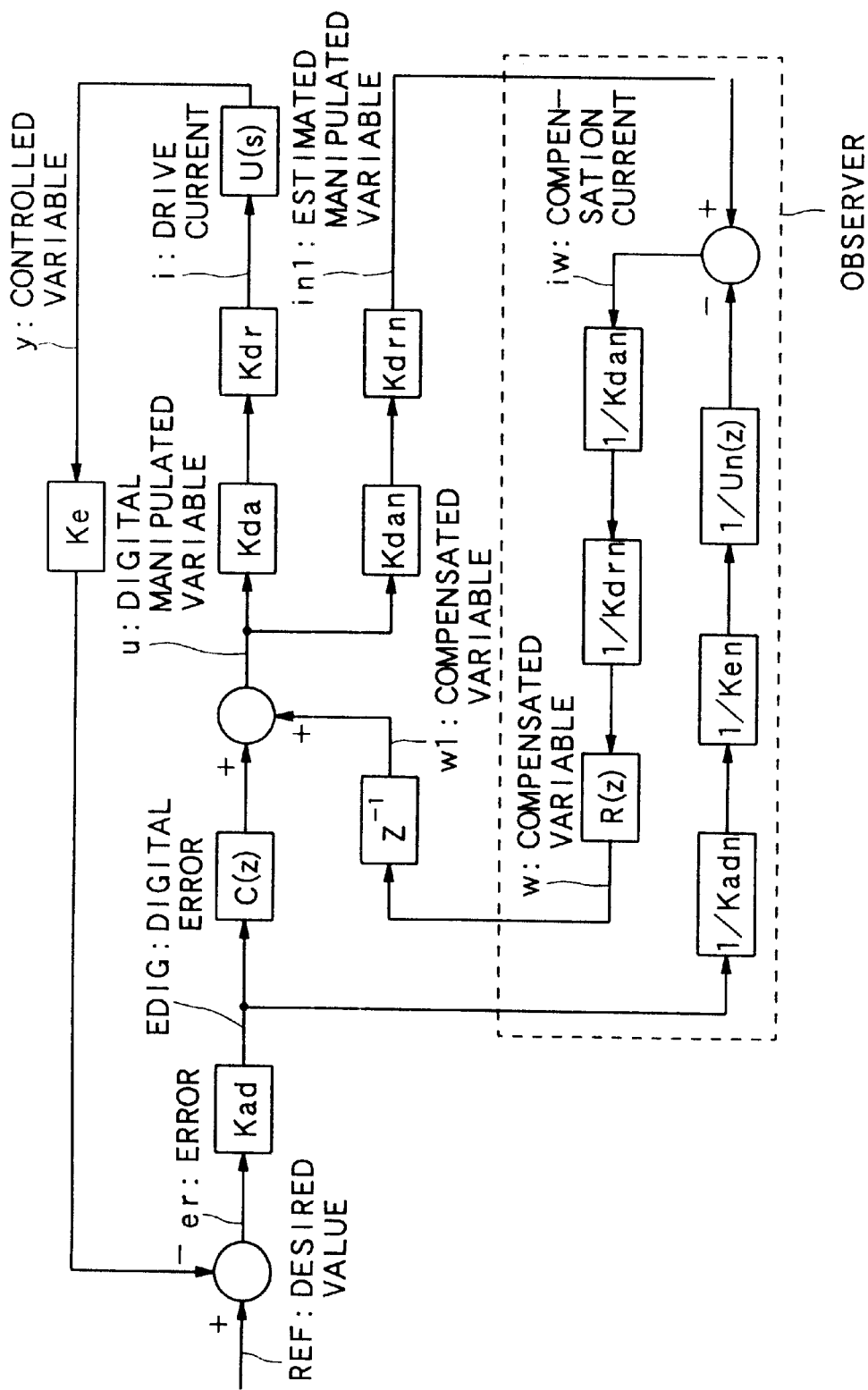
FIG. 12 is a block diagram showing a detailed construction of a control system according to a fourth embodiment of the present invention.

FIG. 11 is a flowchart showing a process by the observer in a control system of the fourth embodiment, and FIG. 12 is a block diagram showing the whole construction of the control system, and including a block diagram showing internal elements of the observer of the fourth embodiment.

First, an operation of the observer of the fourth embodiment will be described with reference to FIG. 11 and FIG. 12. In an example shown in FIG. 11 and FIG. 12, an operation based on the same operation by an inverse function as the first embodiment is realized in a feedback control system.

In the feedback control system of the fourth embodiment including an observer which is adaptable to the use of an inverse function of the controlled system, as shown in FIG. 11, first, an operation to obtain a digital manipulated variable u of the current sample timing is performed in accordance with the following equation, using the phase compensator C(z) on the basis of a compensated variable w1 output from the observer before one sample timing and the digital error EDIG (step S15).

$$u=EDIG\times C(z)+w1$$

where $w1=z^{-1}\times w$ (in this case, $z^{-1}=\exp(-s\times T)$)

Then, the digital manipulated variable u is supplied to a pre-stage D/A converter of the drive circuit.

Subsequently, an operation to obtain an estimated manipulated variable in1 is performed in accordance with the following equation, using the digital manipulated variable u (input signal of the D/A converter), a nominal value Kdan of the conversion sensitivity Kda of the D/A converter and a nominal value Kdrn of the conversion sensitivity of the drive circuit (step S16).

$$in1=Kdrn\times Kdan\times u$$

Subsequently, an operation to obtain a compensation current iw is performed in accordance with the following equation, using a controlled system U n(z), the nominal value Ken of the conversion sensitivity Ke of an error detector for detecting a rotational frequency error or focus error, and a nominal value Kadn of the conversion sensitivity Kda of the above A/D converter for converting the digital manipulated variable u into an analog signal, the aforementioned digital error EDIG and estimated manipulated variable in1 (step S17).

$$iw=in1-EDIG/(Ken\times Kadn\times Un(z))$$

Finally, an operation to obtain a compensated variable w from the compensation current iw is performed in accordance with the following equation, using the nominal value Kadn of the conversion sensitivity Kda of the above D/A converter, the nominal value Kdrn of the conversion sensitivity Kdr of the drive circuit, and the robust filter included in the DSP (step S18).

$$w1=\{1/(Kdan\times Kdrn)\}\times R(z)\times iw$$

Then, the compensated variable w is stored as a compensated variable w1 in the RAM connected to the DSP in order to be used in the next sample timing.

Thereafter, the computed digital manipulated variable u is converted into an analog signal by the D/A converter so that an analog manipulated signal is generated. Then, the drive circuit is driven by the signal so as to generate a drive signal, and outputs the drive signal to the actuator or spindle motor so that these actuator and spindle motor are driven.

As described above, in the feedback control system of the fourth embodiment, a feedback control is carried out while estimating a disturbance applied to the controlled system on the basis of the digital manipulated variable u and the digital error EDIG. Accordingly, it is possible to dispense a conventionally required A/D converter for digitizing the drive current i, and to simplify the construction of the servo control apparatus, and further, to reduce a production cost and an integration area.

Further, the disturbance corresponding to the current sample timing is estimated using the digital compensated variable w1 before one sample timing and the error EDIG of the current sample timing; therefore, it is possible to accurately suppress a disturbance.

Furthermore, a disturbance after one sample timing is estimated on the basis of the estimated manipulated variable in1 generated by multiplying the digital manipulated variable u by the nominal value Kadn of the conversion sensitivity Kda of the above A/D converter and the nominal value Kdrn of the conversion sensitivity Kdr of the drive circuit, and the error EDIG of the current sample timing. Therefore, it is possible to high accurately estimate a disturbance.

The above fourth embodiment has described the case where the disturbance corresponding to the current sample timing is estimated using the digital compensated variable w1 before one sample timing and the error EDIG of the current sample timing. Further, the digital compensated variable w is delayed for one sample timing so as to obtain the digital compensated variable w1. In addition, in place of the construction, the substantially same effect as the above fourth embodiment can be also obtained from the following construction; as shown in FIG. 12, a delay equipment for delaying each operated value for one sample timing is inserted between the subtracter in the observer and operation points (between controlled elements) where the compensated variable w is output.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 11-34808 filed on Feb. 12, 1999 including the specification, claims, drawings and summary is incorporated herein by reference in its entirety.

What is claimed is:

1. A servo control apparatus for performing a feedback control to an analog controlled system comprising:
   (A) an error generating device that generates a digital error corresponding to a difference between a desired value and a feedback value corresponding to a controlled variable of the analog controlled system;
   (B) a control device that generates a digital manipulated variable; and
   (C) a digital-to-analog converting device that converts the digital manipulated variable into an analog manipulated variable for driving the analog controlled system, wherein the control device comprises:
   (b1) a disturbance estimating device that estimates a disturbance applied to the analog controlled system by carrying out a digital estimating process by using the digital manipulated variable and the digital error, and generates a digital compensated variable corresponding to the estimated disturbance; and
   (b2) a manipulated variable generating device that generates the digital manipulated variable by using the digital error and the digital compensated variable.

2. The servo control apparatus according to claim 1, wherein the disturbance estimating device estimates the disturbance at a current sample timing by using the digital manipulated variable at a previous sample timing and the digital error at the current sample timing.

3. The servo control apparatus according to claim 1, wherein the control device further comprises an estimated manipulated variable generating device that generates a digital estimated manipulated variable by multiplying the digital manipulated variable at a previous sample timing by a nominal value corresponding to a sensitivity of the analog-to-digital device, and a disturbance estimating device estimates the disturbance by using the digital estimated manipulated variable and the digital error at a current sample timing.

4. The servo control apparatus according to claim 1 further comprising a drive device for driving the analog controlled system by using the analog manipulated variable.

5. The servo control apparatus according to claim 4, wherein the control device further comprises an estimated manipulated variable generating device that generates a digital estimated manipulated variable by using a product of the digital manipulated variable at a previous sample timing, a nominal value corresponding to a sensitivity of the analog-to-digital device and a nominal value corresponding to a sensitivity of the drive device.

6. The servo control apparatus according to claim 1, wherein the manipulated variable generating device generates the digital manipulated variable by using the digital compensated variable at a previous sample timing and the digital error.

7. The servo control apparatus according to claim 1, wherein the disturbance estimating device estimates the disturbance on the basis of an internal state thereof at a previous sample timing.

8. The servo control apparatus according to claim 1, wherein the error generating device comprises:
   an analog error generating device that generates an analog error corresponding to the difference between the desired value and the feedback value; and
   an analog-to-digital converting device that converts the analog error into the digital error.

9. The servo control apparatus according to claim 1, wherein the analog controlled system is a rotating device for rotating a recording disk.

10. The servo control apparatus according to claim 1, wherein the analog controlled system is a tracking servo control device for finely adjusting a position of a light beam in a radial direction of an optical disk in an optical disk recording or reproducing apparatus.

11. The servo control apparatus according to claim 1, wherein the analog controlled system is a slider servo control device for roughly adjusting a position of a light beam in a radial direction of an optical disk in an optical disk recording or reproducing apparatus.

12. The servo control apparatus according to claim 1, wherein the analog controlled system is a focus servo control device for focusing a light beam on an optical disk in an optical disk recording or reproducing apparatus.

* * * * *